(No Model.) 2 Sheets—Sheet 1.
J. R. DAVIES.
MOLDING APPARATUS FOR CASTINGS.
No. 300,853. Patented June 24, 1884.
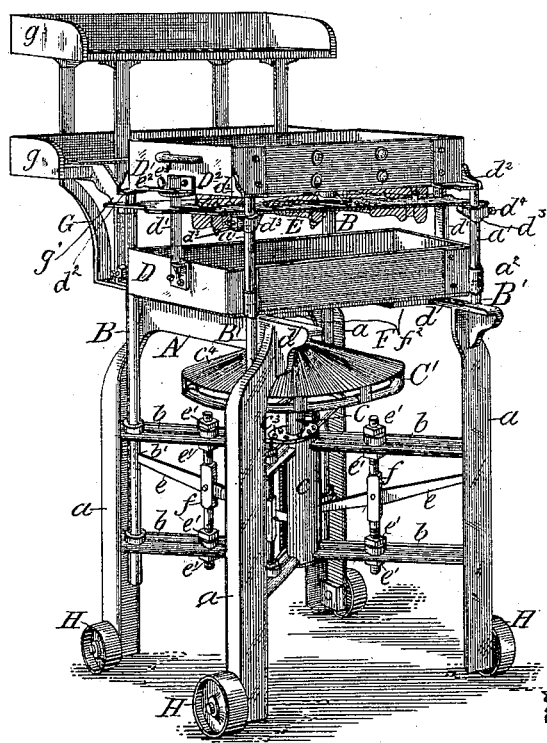
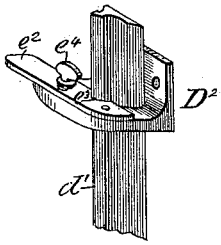
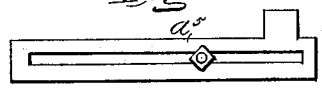
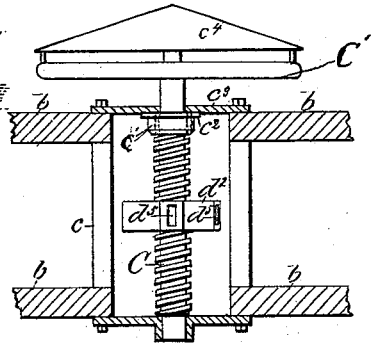
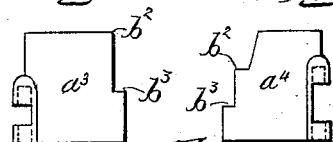
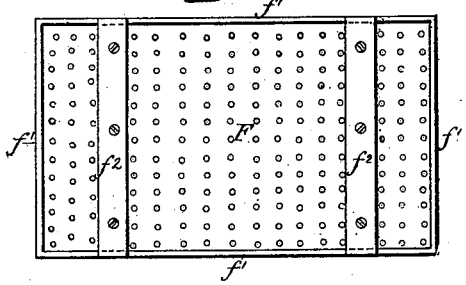
Witnesses:
Inventor:
John R. Davies
by Stout & Underwood
Attorneys

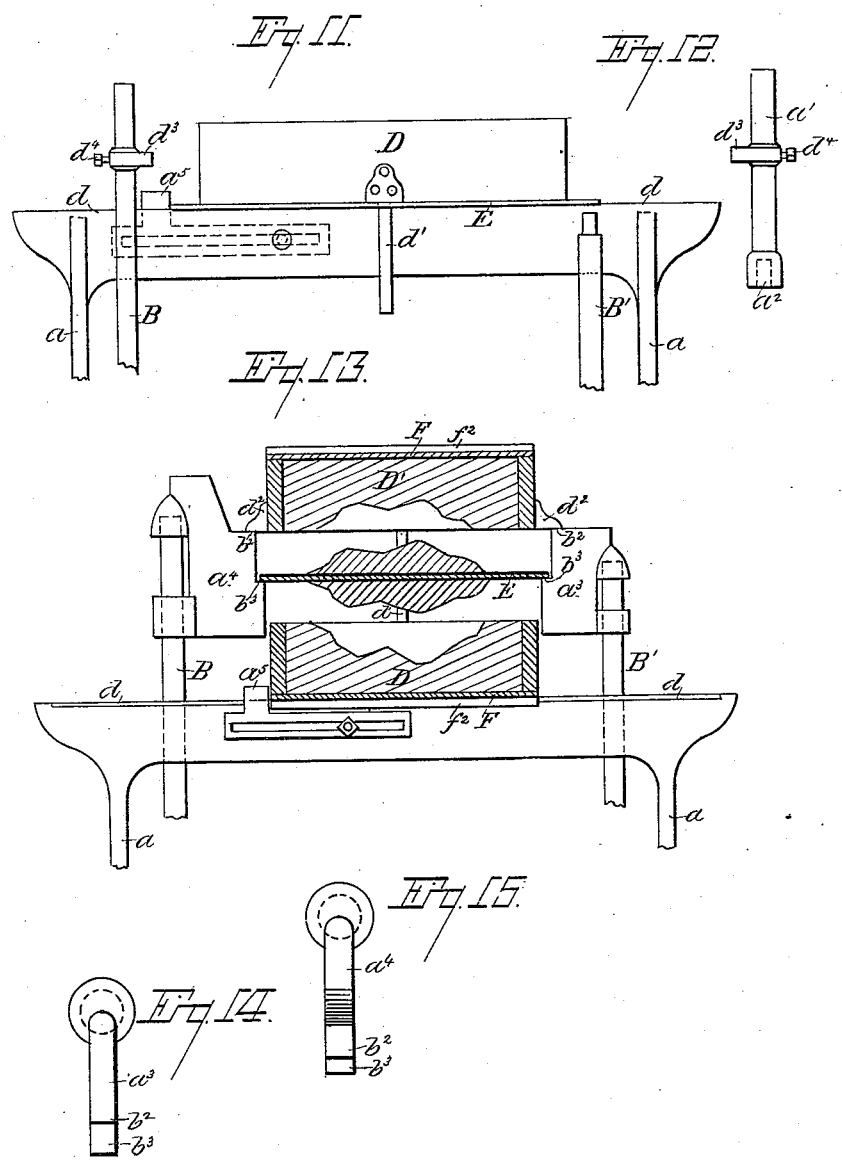

UNITED STATES PATENT OFFICE.

JOHN R. DAVIES, OF WHITEWATER, WISCONSIN.

MOLDING APPARATUS FOR CASTINGS.

SPECIFICATION forming part of Letters Patent No. 300,853, dated June 24, 1884.

Application filed September 3, 1883. (No model.)

*To all whom it may concern:*

Be it known that I, JOHN R. DAVIES, of Whitewater, in the county of Walworth, and in the State of Wisconsin, have invented certain new and useful Improvements in Molding Apparatus for Castings; and I do hereby declare that the following is a full, clear, and exact description thereof.

My invention relates to improvements in molding-machines, and will be fully described hereinafter.

In the drawings, Figure 1 is a perspective view of my apparatus with the drag in place and empty and the match-plate and cope lifted. Fig. 2 is a detached view of part of the lifting mechanism. Figs. 3 to 10, inclusive, are details. Fig. 11 is a side view of the upper part of my apparatus without the operating mechanism, but with the drag inverted and resting on the match-plate. Fig. 12 is a detail. Fig. 13 is a vertical transverse section of a portion of my device, showing the match-plate suspended between the cope and flask. Figs. 14 and 15 are plan views of brackets to be used when molding is done in small flasks.

A is the frame, having its legs $a\,a\,a\,a$, with casters H, rails $d\,d$, arms $b\text{-}b\,b$, and slotted center $c$ cast in one single piece.

B B and B' B' are the lifters, which run loosely in holes of arms $b\,b\,b$, and are supported by means of slots $b'\,b'$, formed in them, upon long arm of tilting-levers $e\,e$, hung in slot of fulcrum-standards $f\,f$, which have nuts $e'\,e'\,e'\,e'$ to minutely adjust them, as desired. The short arm of said tilting-levers $e\,e$ is inserted in slots $d^5\,d^5$ of nut $d^2$, threaded on screw C. Said screw C has its lower end supported in proper bearings in hub or center of frame, $c$, and has collar $c'$ fitting freely in head of hub. A washer, $c^2$, notched on its inside rim to allow free flow of oil to screw C, is set between said collar $c'$ and the cap $c^3$, which is secured by proper bolts on top of hub $c$.

C' is the hand-wheel properly keyed on upper end of screw C, to operate same. It has the convex webbing $c^4$, to shield the screw from drippings of sand or dirt from the flasks.

D and D' are the flasks. D, the lower part—called the "drag"—rests on the rails $d\,d$ of frame A. It has bolted in center of its right and left sides the three-cornered pins $d'\,d'$, to slide through corresponding triangular openings of the match-plate E, on both sides of which the pattern is fixed in the division-line of its draft, and to slide also through similar openings in the female guide-plates $D^2$, bolted in the sides of the upper part, D', called the "cope," of flask. The two outside faces of said pins $d'\,d'$ are gouged in, so as to leave only a narrow straight edge on each side of its point, securing thereby an easy-working and minutely-exact adjusting device for the two parts of the flask and the match-plate. To firmly hold these same together when adjusted, the female guide-plates $D^2$ have hinged on their upper face latch $e^2$, having notch $e^3$, to grasp the outside point of guide-pins $d'\,d'$, against which they are maintained by means of thumb-screw $e^4$, threading in said guide-plates. The match-plate E may also be provided with said latch $e^2$, to act in connection with above-described one and help it, if needed. The upper part of flask or cope D' is supported on top of lifters B B and B' B' by its brackets $d^2\,d^2$. Brackets $d^3\,d^3$, which may be adjusted along said lifters at the height required by set-screws $d^4\,d^4$, are made to support the match-plate E and raise same from the lower part of flask or drag D after the upper one or cope D' has itself been raised from said match-plate E. The front lifters, B, are made shorter than the rear ones, B', by the depth of the lower part of flask or drag D; but they have the extension-pieces $a'\,a'$ to bring their tops to the level of the rear ones. These extensions $a'\,a'$ have sockets $a^2\,a^2$ to fit on lifters' tops, and they are put aside when the filling and packing of the lower part of flask is going on, and are put in place for use in the manipulation of the upper part of flask.

$a^3$ and $a^4$ are extension-brackets to be used when a smaller flask has to be filled, $a^3$ being put in place of extension-pieces $a'\,a'$, and $a^4$ fitting on the rear lifters. The brackets $a^3$ and $a^4$ are each provided with a shoulder, $b^3$, to support the match-plate, and a shoulder, $b^2$, to take under brackets $d^2$ on the cope D', so that when the lifters rise the shoulders $b^2$ first raise the cope, and then the shoulders $b^3$, coming in contact with the match-plate, lift it off the drag.

$a^5$ is a stop for the lower part of flask or drag D. It is provided with a long slot, whereby it is adjusted and fixed by set-screw on the inside of the rails $d$. The bottom of drag and cope of flask is a perforated plate, F, formed with a bead, $f'$, along the edges of its lower face, on which it slides on said rails $d$. It has also the wooden cleats $f^2 f^2$, screwed in its lower face, to guide it between said rails $d$. This form is very convenient, as, besides making it light, the perforations secure a more perfect bedding of the same on the sand and take up the surplus, if any, and will also give an easy escape of the gases produced when the metal is poured in.

G G are brackets bolted to the back of the frame, supporting shelves and drawer $g$ $g$, for tools, &c. The frame-legs are provided with small wheels or casters H H.

The operation of the above-described machine is as follows: The pattern, having been previously fixed on the match-plate in the division-line of draft, is set in its place on top of lower part of flask or drag D. The guide-pins $d'$ of the drag being inserted in the openings made for them in said match-plate E, the extension-pieces $a'$ are taken off from the top of front lifters, and said drag D of flask is set on the rails, with the match-plate E as a bottom. The drag being filled and packed as usual, its perforated bottom plate, F, is put over it, and the whole is turned over on the rails $d$, bringing the match-plate on top. The extension-pieces $a'$ $a'$ are then put in their place on the front lifters. The upper part or cope of flask is set in its place on top of match-plate, filled with sand, and packed, as usual, when the operator, by a few turns of the wheel, brings the lifters up to the brackets $d^2$ $d^2$ of upper part or cope of flask, and raises same from the match-plate as high as desired. At the same time brackets $d^3$ on the lifters, which have previously been set at the right distance and secured by set-screws $d^4$, are up to the match-plate E. The operator continues turning the wheel until the patterns are all clear from the sand. The upper part or cope, D', is then simply turned up on its side (from the operator) on top of the back lifters, resting on brackets $g'$, put there for that purpose. The patterns are then set off and the mold finished. The upper part or cope of flask is then turned down and put to rest on the lifters in the same manner that it was when lifted off of the match-plate. The operator, by a few turns of the wheel, lowers it on the drag with perfect safety, and the extension-pieces $a'$ $a'$ being removed from the front lifters, the finished mold or flask is set off on the floor, in readiness for pouring.

Having thus described my invention, what I claim as new and useful, and desire to secure by Letters Patent, is—

1. A stand for molders' flasks, having supports for the drag of the flask and lifters for engaging with projections on the cope of the flask, said lifters being operated by levers and a screw, as set forth.

2. The lower half or drag of flask having guide-pins, in combination with the match-plate having guiding-slot, with or without adjusting-latch, the upper half or cope of flask having guide-plates with adjusting-latch, each slotted to receive a guiding-pin, as set forth.

3. The guiding-pins having latches which are pivoted at one end and slotted near the other, in combination with a binding-screw for securing it in adjustment, whereby all horizontal play of the halves of flask and match-plate is avoided, as set forth.

4. The central lifting-screw, levers radiating from its housing, and a nut traveling on said screw, in combination with the lifting-pins, as set forth.

5. The perforated bottom plate having a bead and cleats, in combination with the flask and rails of frame, as set forth.

6. A molding apparatus for castings, consisting of frame A, having legs $a$ $a$ $a$, arms $b$ $b$ $b$, hub $c$, and rails $d$ $d$, cast in one piece, and brackets G for shelves; of the lifting-screw C, having slotted nut $d^5$, tilting-levers $e$ $e$ $e$ $e$, and adjustable fulcrum-standards $f f f$; of the lifters B B B' B', with extensions $a'$, $a^3$, and $a^4$; of drag D of flask, having guide-pins $d'$ $d'$, and of cope D' of flask, having guide-plate $D^2$, and of match-plate with opening for guide-pins $d'$ $d'$, and adjustable brackets $d^3$, and perforated bottom plates F of flask, with head $f'$ and cleats $f^2$, substantially as shown and described, and for the purpose set forth.

7. In a molding apparatus for castings, the combination of flask, having guide-pins $d'$ $d'$ in its drag D, with match-plate E, having openings for said pins, and cope D', having female guide-plate $D^2$ and brackets $d^2$, substantially as shown and described, and for the purpose set forth.

8. In a molding apparatus for castings, the combination of drag D and cope D' of flask and match-plate E with lifters B B and B' B' and extensions $a'$, $a^3$, and $a^4$, substantially as shown and described, and for the purpose set forth.

9. In a molding apparatus for castings, the combination of the lifters B B and B' B', having slots $b'$ $b'$, with the tilting-levers $e$ $e$ $e$ and adjustable fulcrum-standards $f f$, substantially as shown and described, and for the purpose set forth.

10. In a molding apparatus for castings, the combination of the tilting-levers $e$ $e$ $e$ and adjustable fulcrum-standards $f f f f$, with slotted screw-nut $d^2$, lifting-screw C, and screw-wheel C', substantially as shown and described, and for the purpose set forth.

In testimony that I claim the foregoing I have hereunto set my hand, on this 14th day of August, 1883, in the presence of two witnesses.

JOHN R. DAVIES.

Witnesses:
T. D. WEEKS,
JAS. G. KESTOL.